(12) United States Patent
Klein et al.

(10) Patent No.: US 7,917,610 B2
(45) Date of Patent: Mar. 29, 2011

(54) XML CONTROL MANAGEMENT

(75) Inventors: John Klein, Morgan Hill, CA (US);
Frank James, Hollister, CA (US);
Michael Goodfellow, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 2311 days.

(21) Appl. No.: 10/410,468

(22) Filed: Apr. 9, 2003

(65) Prior Publication Data

US 2003/0229696 A1 Dec. 11, 2003

Related U.S. Application Data

(60) Provisional application No. 60/370,920, filed on Apr. 9, 2002.

(51) Int. Cl.
| | |
|---|---|
| G06F 15/16 | (2006.01) |
| G06F 15/173 | (2006.01) |
| G06F 15/177 | (2006.01) |
| G06F 17/28 | (2006.01) |
| G01R 31/08 | (2006.01) |
| H04J 1/16 | (2006.01) |
| H04J 3/14 | (2006.01) |
| H04L 12/26 | (2006.01) |
| G06F 17/00 | (2006.01) |
| G06F 3/00 | (2006.01) |
| G06F 11/00 | (2006.01) |
| G06F 15/00 | (2006.01) |
| H04L 1/00 | (2006.01) |

(52) U.S. Cl. ........ 709/224; 709/202; 709/221; 709/226; 709/229; 709/235; 715/239; 715/735; 715/736; 370/242

(58) Field of Classification Search .................. 709/202, 709/203, 221, 223–229, 235; 715/513, 733–737; 714/25; 370/242

See application file for complete search history.

(56) References Cited

U.S. PATENT DOCUMENTS

| | | | | |
|---|---|---|---|---|
| 6,389,464 | B1 | 5/2002 | Krishnamurthy et al. | 709/220 |
| 6,397,256 | B1 | 5/2002 | Chan et al. | 709/229 |
| 6,456,308 | B1 | 9/2002 | Agranat et al. | 345/854 |
| 6,539,422 | B1 * | 3/2003 | Hunt et al. | 709/217 |
| 6,571,201 | B1 | 5/2003 | Royal, Jr. et al. | 702/188 |
| 6,823,522 | B1 * | 11/2004 | Lamb | 719/316 |
| 6,857,013 | B2 * | 2/2005 | Ramberg et al. | 709/223 |
| 6,950,868 | B1 * | 9/2005 | Faraldo, II | 709/224 |
| 7,082,464 | B2 * | 7/2006 | Hasan et al. | 709/223 |

(Continued)

FOREIGN PATENT DOCUMENTS

WO 99/57649 11/1999

(Continued)

OTHER PUBLICATIONS

Letter from Michael Goodfellow (one of the inventors) to Mark Koffsky, Esq. Jun. 24, 2003. pp. 1-2.*

(Continued)

*Primary Examiner* — Ian N Moore
*Assistant Examiner* — Melvin H Pollack

(57) ABSTRACT

Embedded devices in a data communications network are arranged to formulate XML data messages containing data representing the operation of the embedded device. The software in the embedded device acts as a server that can be accessed over the network by a browser program in a computer to monitor device operation. The browser program can formulate XML command messages which are sent over the network to the embedded device to control its operation.

8 Claims, 3 Drawing Sheets

U.S. PATENT DOCUMENTS

| | | | |
|---|---|---|---|
| 7,089,259 B1 * | 8/2006 | Kouznetsov et al. | 707/102 |
| 7,093,005 B2 * | 8/2006 | Patterson | 709/220 |
| 7,103,647 B2 * | 9/2006 | Aziz | 709/220 |
| 7,308,487 B1 * | 12/2007 | Dansie et al. | 709/219 |
| 7,313,608 B1 * | 12/2007 | Swedor et al. | 709/221 |
| 7,392,309 B2 * | 6/2008 | Childers et al. | 709/224 |
| 7,418,484 B2 * | 8/2008 | Presley | 709/220 |
| 7,600,029 B1 * | 10/2009 | Mashinsky | 709/228 |
| 2001/0037358 A1 * | 11/2001 | Clubb et al. | 709/203 |
| 2002/0161885 A1 * | 10/2002 | Childers et al. | 709/224 |
| 2002/0184300 A1 * | 12/2002 | Schmeling et al. | 709/202 |
| 2003/0145042 A1 * | 7/2003 | Berry et al. | 709/203 |

FOREIGN PATENT DOCUMENTS

| | | |
|---|---|---|
| WO | 2001/091313 | 11/2001 |

OTHER PUBLICATIONS

John, Ajita, et al. "XNAMI—An eXtensible XML-based paradigm for Network and Application Management Instrumentation," IEEE Intl. Conference on Networks, Sep. 28-Oct. 1, 1999, pp. 115-124.*

Waldbusser, S. "Remote Network Monitoring Management Information Base," RFC 2819, May 2000, pp. 1-98.*

Phaal, P. et al. "InMon Corporation's sFlow: A Method for Monitoring Traffic in Switched and Routed Networks," RFC 3176, pp. 1-31.*

Tellez et al., "Management solutions for WDM Networking," ICON 2000 Proceeding, IEEEE International Conference E, Sep. 2000, pp. 120-124.

Hung et al., "The Application of Web-Based Technologies on Integrated Network Management", IEEE Globecom 1998, IEEE Global Telecom Conference, Jan. 1, 1998, pp. 1094-1098.

* cited by examiner

XML CONTROL MANAGEMENT

REFERENCE TO RELATED APPLICATIONS

This application claims the benefit of Provisional Application Ser. No. 60/370,920, filed Apr. 9, 2002.

BACKGROUND OF THE INVENTION

This invention relates to data communications networks, and particularly to methods for controlling such networks and monitoring the operation thereof in connection with data traffic.

It is an object of the invention to provide an improved method for monitoring and controlling the operation of embedded devices, such as access points and routers, in a data communications networks.

SUMMARY OF THE INVENTION

In accordance with the invention there is provided a method for monitoring operation of embedded devices in a network having a computer with a user interface and at least one embedded device for carrying out network data communications. An XML server is provided at the embedded network device and arranged to monitor operational data in the embedded device. The XML server provides XML data messages having data representing the operational data of the embedded device over the network to the computer. A browser program is provided at the computer for receiving the XML data messages from the XML server and for providing corresponding data to a user via the user interface.

In one arrangement the data can be graphically displayed to the user in a display representing the data received from one or more embedded devices. The data may represent data traffic rate handled by the embedded device, device statistics, error rates, current configuration settings and alerts.

In a preferred arrangement the user can formulate XML command data messages for controlling the operation of the embedded device. The command messages are configured by the browser and sent to the embedded device over the network. The server program is arranged to receive and parse the XML command messages and store the command data in the embedded device for controlling the operation thereof.

DESCRIPTION OF THE INVENTION

Figure 1:
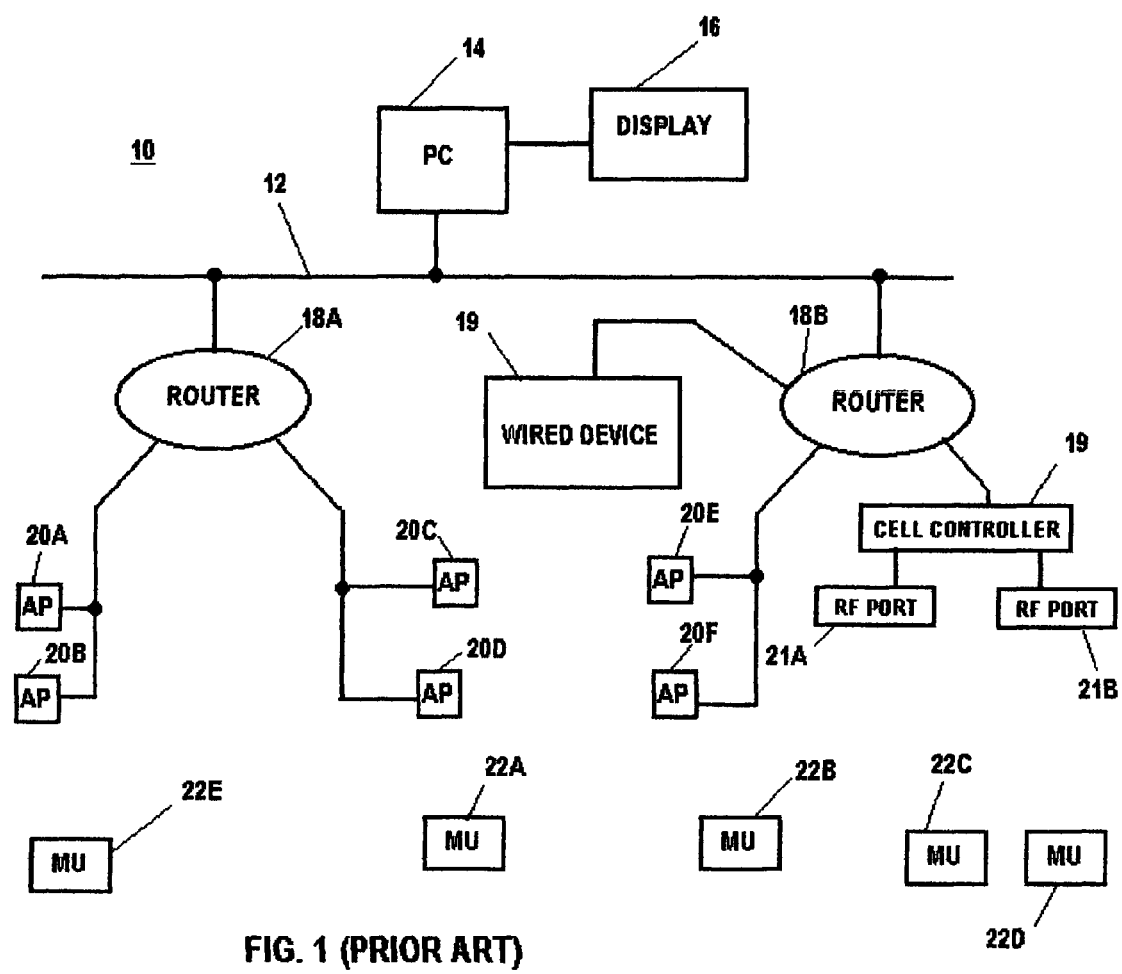
FIG. 1 is a block diagram of a data communications network in which the method of the present invention may be practiced.

Referring to FIG. 1, there is shown a data communications network 10, which in the FIG. 1 example includes a personal computer 14, which may be provided for the purpose of monitoring and controlling of network operation. Network 10 includes wired network 12 and routers 18A and 18B connected thereto for data communications with computer 14 and other computers connected to wired network 12. In addition to devices that are connected to network 10 by wired connections, there are provided mobile units 22A to 22E which are in wireless communication with network 10 by wireless data communication with access points 20A through 20F, using a selected wireless communication protocol, such as IEEE Standard 820.11. Wireless data communications may also be provided using one more cell controllers 19, which operate in conjunction with RF Ports 21A and 21B, as described in copending U.S. patent application Ser. No. 09/528,697 filed Mar. 17, 2000, the disclosure of which is incorporated herein by reference. Routers 18A and 18B interconnect the access points and wired devices 19 to the wired network 10.

In a large institution, such as an industrial facility, educational institution or hospital, network 10 may be very large and complex. In such systems it is desired that the system administrator using computer 14 have the ability to monitor system operation, including overload or failure of embedded devices, such as routers 18, Access Points 20 and other devices, such as telephone system interfaces that may be part of the system.

The present invention provides a method wherein a system administrator can monitor operation of the embedded devices, to determine their operational status and traffic load. The invention further provides a method of providing command data messages for controlling operation of such embedded devices using the network control computer 14.

The embedded devices are provided with a specialized eXtensible Markup Language (XML) based management interface. The XML management interface provides a complete interface for the various functions of the embedded network device, including real time device statistics, system alerts and notification, device command and control and configuration settings, user interface design and validation, all of which are defined in a specialized embedded markup language. The user interface is accessed through a browser program operating on computer 14 and executed on a variety of Java enabled agents. This feature enables direct access to the embedded device from computer 14 on network 10 or through an interface form the World Wide Web.

The Java applet in computer 14 typically runs in the context of a Java enabled browser and processes XML messages provided from the embedded devices in a specialized markup language similar to HTML. The markup language is selected to have tags and attributes that correspond to the attributes of the embedded network device. The XML language is selected to provide communication of generalized embedded device variables that can be communicated to the computer 14 and modified by an applet or the user and displayed to the system administrator via a User Interface. In addition The administrator can originate XML control messages to be sent to the embedded device to modify the variables stored therein and thereby control its operation.

An XML applet and a portable server component are provided in the embedded device and run on the embedded device processor. The server component is preferably an HTTP and XML server built from a set of portable software modules. The XML server can communicate to the core of the embedded device in a variety of ways to retrieve or to store system variables. The applet portion is stored on the embedded device, but executes in the context of a Java enabled agent or browser. The applet includes a general HTTP and XML protocol handlers, which implement highly secure network access to various functions and data from the server on the embedded device, as well as markup parsing, embedded system variable and content objects, that format and display GUI control objects within the applet.

The system enables an embedded device to provide a complete management interface including real-time statistical information, command and control, and configuration to any XML enabled client by writing some simple markup language. The system connects the embedded device system variables and information to a UI using a simple markup language. The simple markup language defines special UI control objects designed to display specialized embedded network device information in an easy to understand graphical format. In addition the system can update the system variable information displayed by the applet in real-time reflecting the current state of the embedded device.

Figure 2:
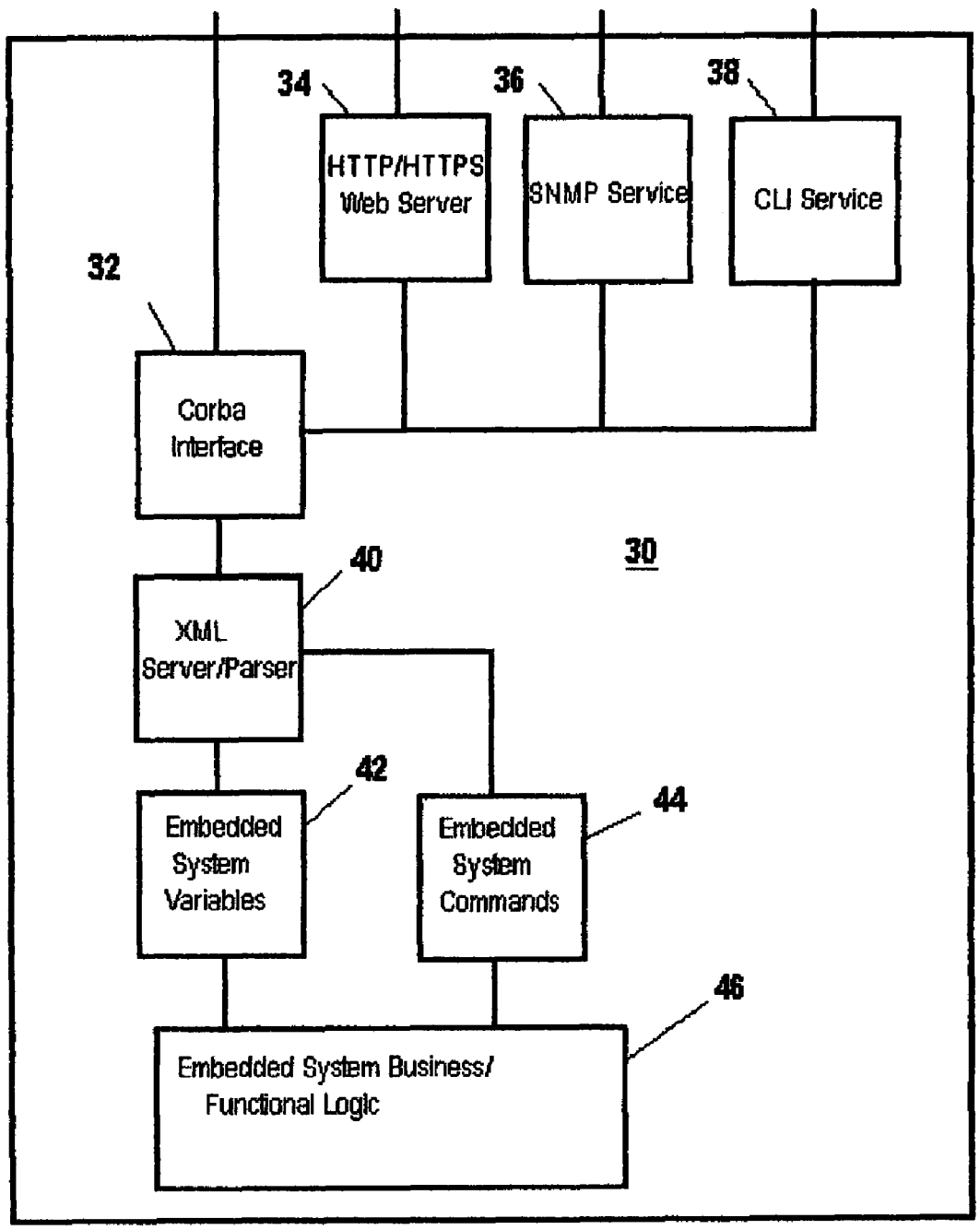
FIG. 2 is a block diagram illustrating the software configuration of an embedded device according to an embodiment of the method of the present invention.

As shown in FIG. 2, XML messages are sent and received by the core logic of the embedded device using an open standards CORBA interface 32. The CORBA interface 32 can be used to access the device and the services it offers by any client that is CORBA capable. The CORBA interface 32 is also used internally by the HTTP Web server 34, SNMP services 36 and Command Line Interface (CLI) services 38. The CORBA interface can also be accessed by an external CORBA client device.

The XML Server/Parser 40 formulates XML data messages by reading operational data concerning embedded system variables 42 from the processor of the embedded device. These variables include operational data generated in the embedded system business/functional logic 46. The XML Server/Parser 40 also receives and parses command messages in XML format from the computer 14 over the network and provides embedded system command variables 44 to be stored in the device and available to the embedded system business/functional logic 46.

One simple example of XML that may be used across the interface is as follows:

```
<config>
    <RFPort_Profiles>
        <rfpprofile config="Default RFPort
Profile,rfpp_desc1,runtime1.img,
diagnostic1.img,envsens1.img,1,3,5,1,2.0,10,3,3,FF.FF.
FF.00,
            FF.FF.00.00,1,64" />
        <rfpprofile config="Alternate RFPort
Profile,,rfpRuntime.bin,
rfpDiagnostics.bin,rfpEnvironment.bin,9,0,0,0,,32,8,8,
            00.00.00.00,00.00.00.00,1,256" />
    </RFPort_Profiles>
    <CC_Profiles>
        <cc_profile config="Default CC Profile 0"
rfport_profiles="Default RFPort Profile"/>
        <cc_profile config="Default CC Profile 1"
rfport_profiles="Alternate RFPort Profile"/>
    </CC_Profiles>
    <CC config="CellController Name,CC
Description,1,Default CC Profile 0,
        CellController. ini,
/usr/bin/apache/cc,1,00:A4:C0:91:D2:9C" />
    <RFPort>
        <RF config="RF
Port#1,AA:AA:AA:AA:AA:AA,1,40,RFPort Location,v1.00,
            Default RFPort Profile,9,1.0,082101,US"
graphs ="Graph_RFPort_0"/>
        <RF config="RF
Port#2,AA:AA:AA:AA:AA:BB,1,40,RFPort Location,v1.00,
            Default RFPort Profile,9,1.0,082101,US"
graphs="Graph_RFPort_1"/>
    </RFPort>
```

-continued

```
    <Graphs>
        <CC_Profiles></CC_Profiles>
        <RFPort_Profiles></RFPort_Profiles>
        <RFPort>
            <gr
configr="AA:AA:AA:AA:AA:AA,Graph_RFPort_0,0,RfTx,0,RfRx
" />
            <gr
config="AA:AA:AA:AA:AA:BB,Graph_RFPort_1,1,RfTx,1,RfRx
" />
        </RFPort>
    </Graphs>
</config>
```

The XML above would be used by a software client such as an Applet to display properties or data related to the business objects contained in the embedded device. In this case, a Cell Controller device 19 and its' properties, and two RF Port devices 21A and 21B and their properties. In addition, graphical information about the RF Port devices is also delivered to the Applet software for display.

Once the client software (such as an applet) has created a display object that represents a business object in the embedded device, the embedded device can push an updated data set to the connected client. The data can be immediately rendered by the client software. An example of XML data pushed across the interface is as follows:

```
//Data for statistic graph on the Applet(PUSH MODEL)

<metric>
        <stats statType="RfTx" oid="12">
        <stats statType="RfTx" oid="0"
val="#,998690869,318,#,998438936,271,#,998438976,
253,373,290,323,289,302,296,268,309,250,305,314,316,
308,255,281,348,302,313,347,302,315,281,326,333,314,
313,283,295,293,270,301,296,257,266,272,#,998439096,
292,301,296,304,292,285,299,291,#,998439816,208,298,
296,298,294,299,297,295,299,290,290,301,296,301,298,
295,300,298,291,296,297,308,295,296,295,295,302,300,
293,297,301,298,299,297,294,291,301,300,302,292,295,
298,297,295,296,291,290,299,298,294,301,301,289,297,
301,296,292,297"
>
        <stats statType="RfRx" oid="0">
        <stats statType="RfTx" oid="1">
        <stats statType="RfRx" oid="1"
val="#,998690869,366,#,998442856,265,151,282,
467,371,286,256,297,541,352,584,534,353,365,334,472,
322,#,998442916,444,324,414,421,393,422,431,398,
360,406,425,439,415,385,382,394,367,371,359,371,410,
473,395,435,365,361,368,386,410,423,434,339,366,397,
441,341,408,386,400,364,383,418,382,337,395,443,379,
349,439,358,405,409,389,406,429,358,391,#,998443036,
391,398,395,401,395,388,388,406,391,386,#,998443756,
423,290,291,304,296,297,296,290,298,296,296,294,292,
293,297,299,293,290,294,299,301,296,295,296,301,297,
296,295,294,303,303,296,296,296,295,295,293,293,297,
311,395,393,392,391,391,395,401,394,396,392,395,389,
394 ,397,390,395,401,391"
</metric>
```

The XML interface is not only used to store and retrieve data to and from the embedded device, but also can be used as a command interface to the embedded device. The external client (Applet, SNMP, CLI, etc.) can command the embedded device to perform functions by simply sending an XML command to the device. The XML command below commands the embedded device to enable the push of transmit packets to the connected software client, and disables the push of received packets for the business object as follows:

```
<setGroup p="cc.statistic" seq="1">
    <set n="RFPort[1].TxPackets"> <str
    v="true"> </set>
<set n="RFPort[2].RcvPackets"> <str v="false"> </set>
</setGroup>
```

The reply to the XML request is interface is as follows:
`<ok seq="1"/>`

Figure 3:
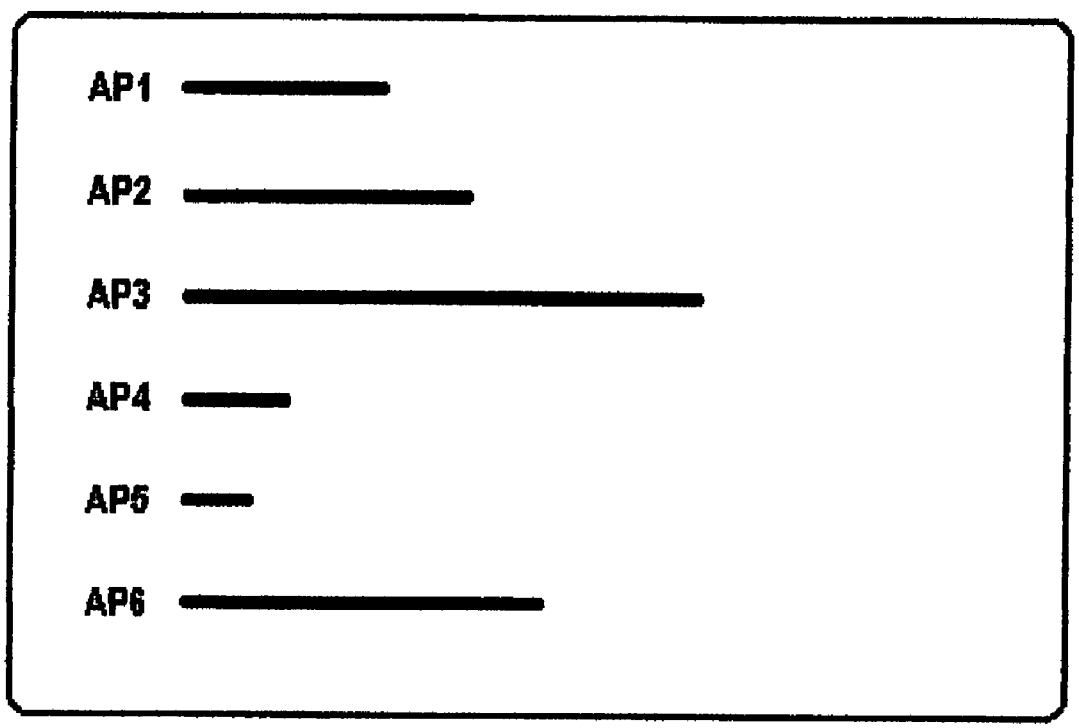
FIG. 3 is an illustration of a first user interface according to an embodiment of the present invention.

The data supplied by one or more embedded devices can be displayed graphically to the user, for example traffic via Access Points or RF Ports can be displayed as a speedometer display as shown in FIG. 3.

While there have been described what are believed to be the preferred embodiments of the invention those skilled in the art will recognize that other changes and modifications may be made thereto without departing from the spirit of the invention, and it is intended to claim all such changes and modifications as fall within the true scope of the invention.

We claim:

1. In a network having a computer with a user interface for monitoring network operation and having at least one embedded network device having a processor for carrying out network data communications, a method for monitoring operation of said embedded device, comprising:

providing an XML server running in said embedded network device processor, said XML server being arranged to monitor operational data in said processor and provide XML data messages having data corresponding to said operational data over said network to said computer;

and providing a browser program in said computer for receiving said XML data messages from said XML server and for providing corresponding information to a user via said user interface.

2. A method as specified in claim 1 wherein said operational data comprises data corresponding to traffic volume at said embedded device.

3. A method as specified in claim 1 wherein said operational data comprises data representing malfunction of said embedded device.

4. A method as specified in claim 1 wherein said operational data comprises data corresponding to embedded device operational statistics.

5. A method as specified in claim 1 wherein said operational data comprises data representing current configuration of said embedded device.

6. A method as specified in claim 1 wherein said operational data comprises data corresponding to embedded device error rate.

7. A method as specified in claim 1 wherein said operational data comprises data representing alerts concerning operation of said embedded device.

8. In a network having a computer with a user interface for monitoring and controlling network operation and having at least one embedded network device having a processor for carrying out network data communications, a method for monitoring and controlling operation of said embedded device, comprising:

providing an XML server running in said embedded network device processor, said XML server being arranged to monitor operational data in said processor and provide XML data messages having data corresponding to said operational data over said network to said computer and to receive XML command data messages over said network and to store command data corresponding to said command data messages in predetermined locations in said processor;

and providing a browser program in said computer for receiving said XML data messages from said XML server and for providing corresponding information to a user via said user interface and for receiving command data from said user interface and provide XML command data corresponding to said command data to said embedded device over said network.

* * * * *